G. B. Medberg,
Loom-Pickers.

Nº 41,165.　　　　　　　　　　Patented Jan. 5. 1864.

Witnesses:
F. P. Hale, Jr.
Frederick Curtis.

Inventor:
George B. Medberg
by his attorney
R. H. Eddy

UNITED STATES PATENT OFFICE.

GEORGE B. MEDBERY, OF SPRAGUE, CONNECTICUT.

IMPROVEMENT IN PICKERS FOR LOOMS.

Specification forming part of Letters Patent No. 41,165, dated January 5, 1864.

*To all whom it may concern:*

Be it known that I, GEORGE B. MEDBERY, a resident of Sprague, in the county of New London and State of Connecticut, have invented a new and useful Improvement in the Application of a Loom-Picker to its Staff; and I do hereby declare the same to be fully described in the following specification and represented in the accompanying drawings, of which—

Figure 1:
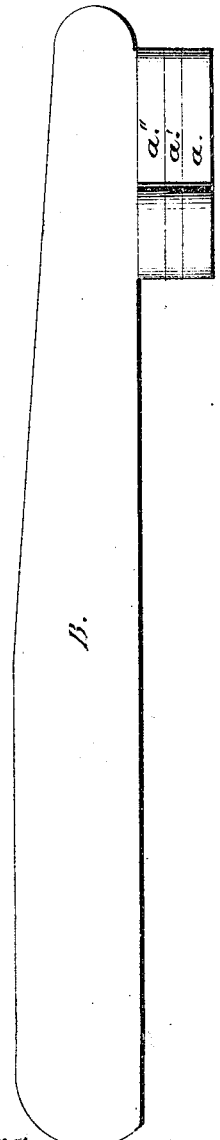
Figure 2:
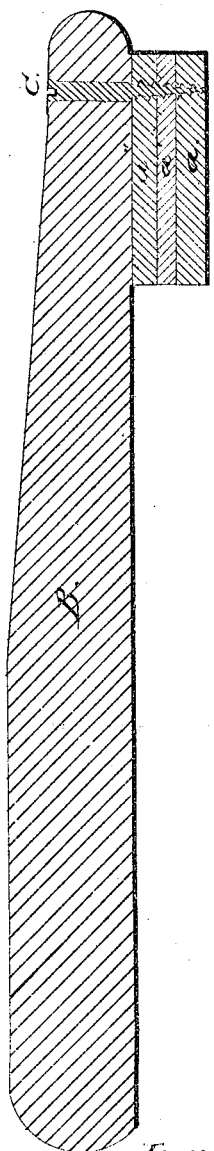

Figure 1 denotes a side view, and Fig. 2 a longitudinal section, of a loom-picker and its staff united, in accordance with my invention.

The loom-picker, consisting of several layers or strata of leather placed one against the other, has usually been connected to its staff by two screws, which simply passed through without being screwed in the picker and screwed into the staff, the heads of the screws being against the picker.

In carrying out my improvement I employ one screw in the connection of the picker to the staff, and pass the said screw through the staff and screw it (the screw) into and through the picker, the same being as shown in the drawings, in which—

A exhibits the picker as composed of several layers, $a\ a'\ a''$, of leather or other suitable material, while B is the staff, and C the screw. The picker at its lower end has no connection with the staff, such portion of the picker being in consequence thereof free to expand lengthwise. A little reflection will suffice to show that great advantages result from my arrangement of the screw relatively to the staff and picker. With the common plan of screwing the screw into the staff the blow of the picker against the shuttle and the race-beam soon causes the screw-threads to be so driven into the staff as to destroy their hold within it; but with my invention, there being no screw-threads in the staff, and the head of the screw being against the staff, the screw under the blows of the picker will maintain its connection not only with the picker, but with the staff. In fact, after long experience it has been found that in no instance while in use has the picker-screw become detached from the staff or failed to secure the picker to the staff when applied in accordance with my improvement.

My improvement is also advantageous in other respects, as whenever the outer layer or stratum, $a$, of the picker may have become too much worn or injured by use it can be readily unscrewed from the screw, and another or new layer substituted for it without the necessity of removing the screw from the staff and picker. Furthermore, each layer, by being separate from the others, serves to clamp the next layer to the screw, and thus to preserve it in place thereon.

I do not claim as my invention the mere employment of screws to fasten the picker to the staff; but

I claim—

My improved application of the parts of the screw and the picker relatively to one another and the staff, the same being substantially as specified.

GEORGE B. MEDBERY.

Witnesses:
R. H. EDDY,
F. P. HALE, Jr.